Figure 1:
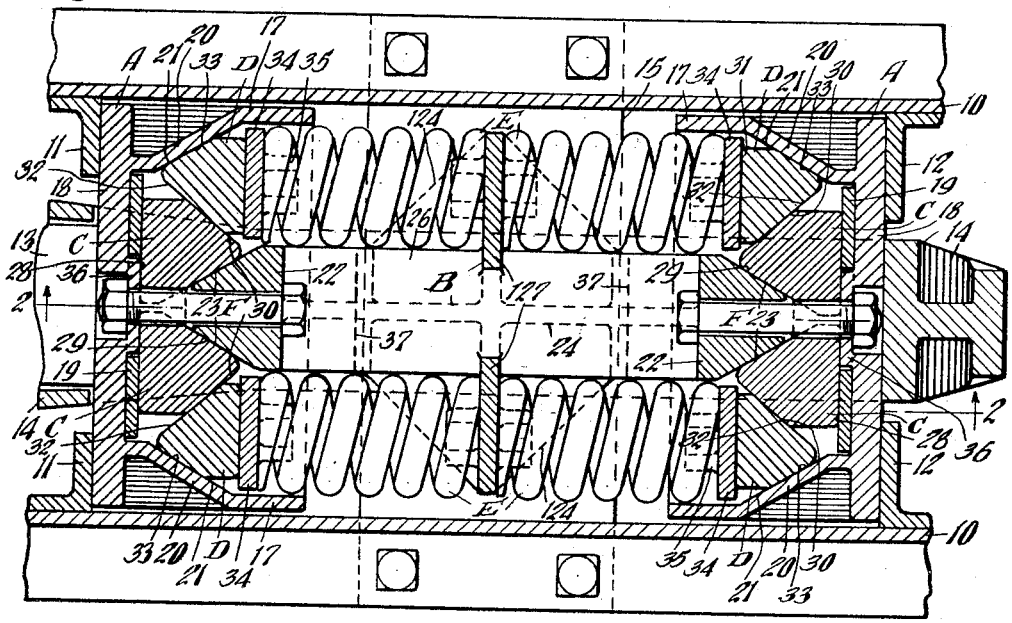

Oct. 18, 1932.  W. A. GEIGER  1,882,799

FRICTION SHOCK ABSORBING MECHANISM

Filed May 16, 1929

Inventor
William A. Geiger
By Joseph Harris
His Atty.

Patented Oct. 18, 1932

1,882,799

UNITED STATES PATENT OFFICE

WILLIAM A. GEIGER, OF CHICAGO, ILLINOIS, ASSIGNOR TO W. H. MINER, INC., OF CHICAGO, ILLINOIS, A CORPORATION OF DELAWARE

FRICTION SHOCK ABSORBING MECHANISM

Application filed May 16, 1929. Serial No. 363,585.

This invention relates to improvements in friction shock absorbing mechanisms.

This application is a continuation in part of applicant's co-pending application Serial No. 355,079 filed April 15, 1929.

One object of the invention is to provide a friction shock absorbing mechanism for railway draft riggings, of the double ended type, including a central column and friction wedge means at opposite ends of the column co-operating with end followers, wherein release of the parts, particularly the wedge friction means at both ends of the mechanism, is assured.

Another object of the invention is to provide a friction shock absorbing mechanism of the double ended type, including end followers, a central column or post, friction wedge means at opposite ends of the mechanism having wedging engagement with the column and end followers, and spring resistance means cooperating with the friction wedge means, the column having abutment means thereon for the spring resistance means, whereby uniform releasing action at both ends of the mechanism is provided, thus assuring release of the friction wedge means at both ends of the gear.

A further object of the invention is to provide a friction shock absorbing mechanism of the double ended type including a centrally disposed longitudinal column, friction wedge means at opposite ends thereof having wedging engagement with the same, each friction wedge means including end followers, and spring resistance means co-operating with the friction wedge means at both ends of the mechanism, wherein the end followers have means connected thereto for restoring the column to centered position between the followers and limiting outward movement of each end follower independently with reference to said column, and wherein the column has abutment means thereon for the spring resistance means, thus assuring release of the mechanism at both ends of the gear.

A still further object of the invention is to provide a friction shock absorbing mechanism, including a central post or column having wedge means at opposite ends thereof; front and rear followers having transverse friction surfaces and interior inwardly converging opposed wedge faces; friction wedge blocks having wedging engagement with opposite ends of the post and frictional engagement with the followers; and spring resisted additional wedge members co-operating with each follower, wherein the parts are held assembled and of uniform over-all length by separate bolts at opposite ends of the mechanism anchored to the post and front and rear followers, wherein the necessary movement of the bolts with respect to the other parts of the mechanism during compression is accommodated in a space inwardly of the ends of the post so that the heads of the bolts do not interfere with the wedge blocks thereby permitting the use of blocks of full size, having wedge faces of maximum area.

Other and further objects of the invention will more clearly appear from the description and claims hereinafter following.

Figure 2:
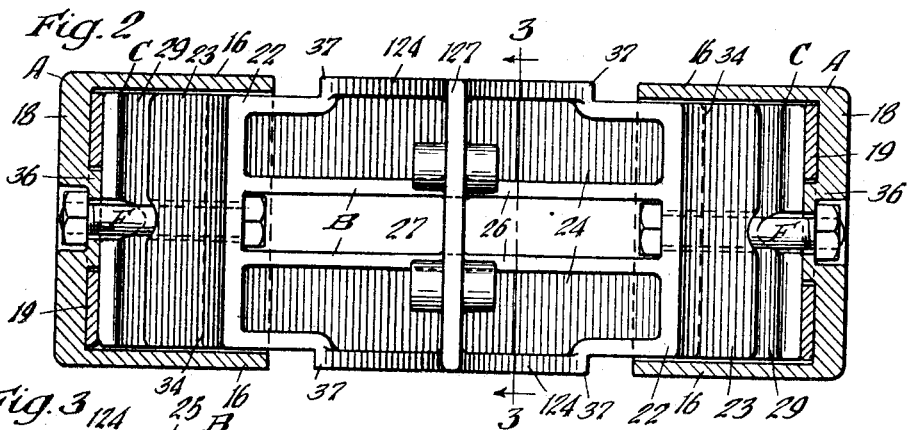
Figure 3:
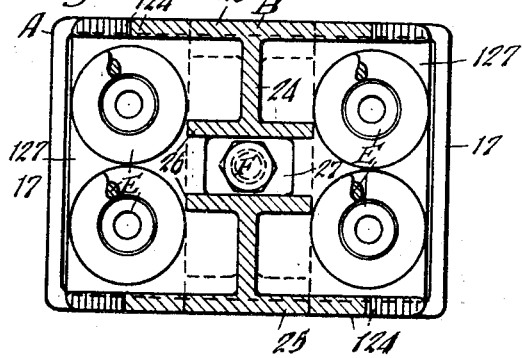

In the drawing, forming a part of this specification, Figure 1 is a horizontal, longitudinal sectional view of a portion of the underframe structure at one end of a railway car, illustrating my improvements in connection therewith. Figure 2 is a longitudinal, vertical, sectional view, corresponding substantially to the line 2—2 of Figure 1. And Figure 3 is a vertical, transverse, sectional view, corresponding substantially to the line 3—3 of Figure 2.

In said drawing, 10—10 indicate channel-shaped center or draft sills of a railway car underframe to the inner sides of which are secured the usual front stop lugs 11—11 and rear stop lugs 12—12. The inner end portion of the coupler shank is indicated by 13 and a hooded yoke 14 of well-known form is attached to the coupler shank and contains my improved shock absorbing mechanism. The yoke and the parts therewithin are operatively supported by a saddle plate 15 secured to the bottom flanges of the draft sills.

My improved friction shock absorbing mechanism comprises, broadly, front and rear follower casings A—A; a central wedge column or post B; a pair of friction wedge blocks C—C at each end of the mechanism; an additional pair of wedge blocks D—D at each end of the mechanism; a main spring resistance comprising a plurality of members E—E at opposite sides of the column and a retaining means in the form of a pair of bolts F—F at opposite ends of the mechanism.

The front and rear follower casings are of similar design, each being in the form of a box-like member of substantially rectangular cross-section open at the inner end. Each casing A has spaced horizontally disposed longitudinally extending top and bottom walls 16—16, spaced vertical side walls 17—17 and a transverse vertical outer end wall 18. The end wall 18 co-operates with the corresponding stop lugs in the manner of the usual follower. The inner surface of the end wall 18 is provided with a liner in the form of a plate 19 which presents a transversely disposed interior friction surface co-operating with the corresponding pair of friction wedge blocks C—C. At the inner ends, the side walls 17 are substantially parallel to the longitudinal axis of the mechanism. Between the last named portions of the side walls and the end wall 18 the former are inwardly inclined, as indicated at 20—20, thereby providing opposed interior, inwardly diverging wedge faces 21—21.

The post or column B is provided with solid portions 22—22 at opposite ends thereof which form the wedge means proper of the column. Each portion 22 has outwardly converging wedge faces 23—23 on opposite sides thereof which cooperate with the friction wedge blocks C. The central portion of the column B comprises top and bottom vertically aligned webs 24—24 reinforced by longitudinally extending top and bottom flanges 25—25 at opposite sides thereof and spaced longitudinally extending ribs 26—26. As most clearly illustrated in Figures 1 and 2, the column B is provided with a longitudinally extending central opening or pocket 27, the top and bottom walls of which are defined by the ribs 26 and the end walls of which are defined by the inner faces of the solid portions 22 at the opposite ends of the column. The pocket 27 is adapted to accommodate the heads of the retainer bolts F for movement during the operation of the mechanism, as hereinafter more specifically pointed out. Midway between the ends thereof, the column B is provided with laterally extending vertical disposed flanges, forming a plate-like follower member 127 which is integral with the column. The flanges forming the follower 127 form continuations of the webs 24, flanges 25 and ribs 26, the plate-like follower being preferably cut out at the center of the column to provide an opening in alinement with the pocket 27.

The follower 127 is reinforced at the front and rear, at opposite sides of the column by extensions 124 of the webs 24, as clearly shown in the drawing.

The friction wedge blocks C—C, which are four in number, are arranged in pairs at opposite ends of the mechanism, each pair being disposed within the corresponding follower casing A. The blocks C are of similar design, each having a flat, transverse outer end surface 28, having sliding frictional engagement with the wearplate 19 of the corresponding casing. At the inner end each block C is provided with a pair of wedge faces 29 and 30 which converge inwardly. The wedge face 29 of each block C is disposed on the inner side thereof and cooperates with the wedge face 23 at the same side of the column or post B.

The wedge blocks D are also four in number and are arranged in pairs at opposite ends of the mechanism, the members of each pair being disposed within the corresponding follower casing A. The blocks D are of similar design, each block having a flat inner end face 31 and a pair of wedge faces 32 and 33 at the outer end thereof which converge outwardly. The wedge face 33 of each block D engages the wedge face 21 at the same side of the corresponding follower casing A and the wedge face 32 engages the wedge face 30 of the block C at the same side of the post B.

The main spring resistance, which is indicated by E, comprises four pairs of twin arranged coils, two pairs being arranged at each side of the post B, one pair in front and the other in back of the follower 127. The members of each pair of coils are disposed lengthwise of the mechanism and in vertical alinement and have their inner ends bearing on the follower 127. Spring followers 34—34 are interposed between each wedge block D and the corresponding ends of the coils of the spring resistance E. As most clearly illustrated in Figure 1, each spring follower is in the form of a rectangular plate having a pair of spaced inwardly projecting bosses 35—35 engaging within the corresponding ends of the twin arranged springs. The follower 127 is provided with similar bosses engaging within the inner ends of the coils of said springs. The bosses 35 of the spring follower 34 and the intermediate follower 127 together serve to hold the springs centered and in assembled relation with the mechanism.

The mechanism is held assembled by the retainer bolts F, which are two in number, and arranged at the opposite ends of the post B. Each retainer bolt F has the shank thereof extending through an opening in the post B and the wedge blocks C are cut away on their inner sides to accommodate the outer portion of the shank of the corresponding bolt. The head of each bolt F is arranged within the pocket or opening 27 of the post B and has shouldered engagement with the transverse inner end face of the solid portion 22 at the corresponding end of the post. As will be evident, the elongated pocket or opening 27 of the post accommodates the heads of the bolts F for inward movement so as to permit the necessary relative movement of the bolts and the post during compression of the gear. At the outer end each bolt is provided with the usual nut which is seated within the pocket of a hollow inwardly projecting boss 36 formed on the end wall 18 of the corresponding follower casing A. Each bolt is thus held against inward movement with respect to the corresponding casing.

The post B is vertically enlarged between the front and rear ends thereof as clearly shown in Figure 2, thereby providing transverse front and rear abutment shoulders 37—37 which are engaged by the inner ends of the corresponding casings when the mechanism is fully compressed, thereby limiting movement of the casings and relieving the main spring resistance E from undue compression. The column B is preferably made of such a length that the opposite ends are spaced from the end walls of the casings A, a distance equal to the clearance between the shoulders 37 and the inner ends of the casings, so that the opposite ends of the post will be engaged by the casings at the same time that the shoulders 37 are engaged thereby, thus also transmitting the forces from the end walls of the casings through the post at full compression of the gear.

The operation of my improved shock absorbing mechanism, during compression, is as follows: The front and rear follower casings A will be moved inwardly toward each other, thereby forcing the friction wedge blocks C at opposite ends, inwardly of the column B, and spreading the blocks C apart laterally, due to the wedging action between the same and the column. The blocks C will thus be forced to slide laterally on the friction surfaces of the casings A. Due to the lateral movement of the blocks C and the wedging action between the same, the blocks D and the casings A, the blocks D will be squeezed out from between the wedge faces of the blocks C and the casings A, thereby forcing the wedge blocks D, at opposite ends of the mechanism, inwardly toward each other and compressing the spring resistance E. As will be evident, in addition to the resistance provided by the springs E and the frictional resistance had on the cooperating friction surfaces of the blocks C and the casings A, frictional resistance is also had between the various cooperating wedge faces. Further, due to the lateral separation of the blocks C which cooperate with the blocks D, a differential action is provided, the blocks D being forced inwardly of the mechanism at a greater rate than the follower casings A, thereby correspondingly compressing the main spring resistance. The operation during both buff and draft is substantially the same in that the follower casings are moved inwardly toward each other. However, as will be evident, the front follower casing is forced inwardly directly by the coupler shank during a buffing action, while the rear follower casing A is pulled forwardly directly by the inner end portion of the yoke during a draft action. Inasmuch as the butt end of the coupler shank operates directly on the front follower casing A, the retainer bolt F at this end of the mechanism is forced inwardly with the coupler shank, the head at the inner end of the bolt moving rearwardly in the pocket or opening 27 of the column B. The bolt at the rear end of the mechanism is forced inwardly during draft, in a similar manner, by engagement of the end section of the yoke with the rear end of the bolt, the necessary movement of the head at the front end of this bolt being accommodated by pocket 27.

When the compression force is reduced during release of the mechanism, the expansive action of the main spring resistance E forces the blocks D outwardly, carrying the casings A and the blocks C therewith. During this action the blocks C will also be forced inwardly toward each other, thereby holding the wedge faces thereof in contact with the wedge faces of the post or column B. Outward movement of the follower casings A is limited by the retainer bolts F which are anchored to the column B, the column B forming a connecting member for these bolts. Outward movement of the casings necessarily limits the movement of the wedge blocks C and D and the parts of the mechanism assume the full release position shown in Figure 1.

In this connection, it is pointed out that if for any reason the wedges at one end of the mechanism should stick or be retarded in their movement and the springs effect restoratiton of the wedges at the other end of the mechanism in advance thereof, the retaining bolts at the last named end of the mechanism will arrest outward movement of the followers with respect to the post or column, thus assuring restoration of the wedge means at the opposite end of the mechanism.

Inasmuch as the bolt at each end of the mechanism limits the relative separation of the post and corresponding end follower, the full release position of the wedge blocks at each end of the mechanism is determined independently and movement thereof positively arrested when the predetermined full release position is reached. In the event that the wedge blocks at one end of the mechanism are retarded in the releasing action, due to excessive friction or for any other reason, and the wedge members at the opposite end of the mechanism reach the full release position in advance of the same, the positive limiting of the releasing movement of these wedge blocks will prevent the springs from further moving the same, whereby all of the remaining energy stored in the compressed springs is exerted entirely on the wedge blocks at the other end of the mechanism, thereby forcing the same to assume the full release position.

The arrangement of the fixed follower member 127 midway of the column cooperating with the inner ends of the sets of springs at opposite ends of the mechanism further assures the release of the friction wedge means at both ends of the mechanism. As the follower member 127 forms abutment means rigid with the post or column, cooperating with the inner ends of the springs, the friction wedge means at opposite ends of the mechanism are subjected to equal restoring force during expansive action of the springs. The accurate restoration of the post and follower thereof is made certain by the separate bolts which are connected to the end followers and column, thereby assuring the proper equalizing action of the springs.

From the preceding description taken in connection with the drawing, it will be evident that I have provided simple and reliable means for assuring restorattion of the parts of a double ended friction shock absorbing mechanism to the full release position; and further have provided an exceedingly simple and efficient retaining means for a shock absorbing mechanism of the character referred to, in that the relatively short retainer bolts which are anchored to opposite ends of the column occupy the minimum amount of space, thereby permitting the use of wedge blocks having full-sized wedge faces. Inasmuch as the heads of the bolts are accommodated within the pocket of the post, they do not take up valuable space at opposite ends of the gear where the wedge blocks are located, which would necessitate the cutting down of the effective wedge faces of the blocks in order to provide space to accommodate the bolt heads. In this connection, it should be noted that a decided advantage is obtained over a construction in which a single retainer bolt is used, which extends from end to end of the mechanism, in that in the last named construction either the head or the nut of the bolt must be accommodated for movement in a hollow boss provided on one of the followers which boss would occupy the space between the innermost wedge blocks with the result that the size of the wedge faces is reduced to such an extent as to interfere materially with the efficient operation of the mechanism.

While I have herein shown and described what I consider the preferred manner of carrying out the invention, the same is merely illustrative, and I contemplate all changes and modifications which come within the scope of the claims appended hereto.

I claim:

1. In a friction shock absorbing mechanism, the combination with a central post having wedge means at opposite ends thereof; of front and rear followers having transverse friction surfaces and interior, inwardly diverging wedge faces; a pair of wedge blocks at each end of the mechanism at opposite sides of the post, each block having wedging engagement with the post and frictional engagement with the transverse face of the corresponding follower; additional wedge blocks at opposite sides of each follower and having wedging engagement therewith and with said first named blocks; spring resistance means opposing relative movement of the second named wedge blocks of said front and rear followers; and separate retainer bolts at opposite ends of the mechanism anchored to said post and followers, each of said bolts extending between the members of one of said pairs of first named blocks, the post having a pocket inwardly of the opposite ends thereof accommodating the inner ends of the bolts for inward movement, said pocket opening through the side of the post to render the pocket accessible.

2. In a friction shock absorbing mechanism, the combination with a central post extending from end to end of the gear and having wedge means at opposite ends thereof and a retaining shoulder adjacent each end inwardly of said wedge means, said shoulders at opposite ends of the post being spaced apart lengthwise of the mechanism, a distance greater than the length of the compression stroke of the mechanism; front and rear followers movable relatively toward and away from each other; pairs of friction wedge members having wedging engagement with the opposite ends of the post and frictional engagement with the followers; wedge blocks having wedging engagement with the followers and wedging engagement with the friction wedge members; spring resistance means interposed between said followers and engaging the wedge blocks and opposing movement thereof; and separate members for anchoring each follower to the corresponding end of the post, each member comprising a shank having enlarged heads at opposite ends, said shank of each member being disposed between the wedge members of the corresponding pair, and said wedge members being recessed on the inner sides to accommodate said shank, said heads having shouldered engagement respectively with one of the followers and the shoulder at the corresponding end of the post, said post being open adjacent said shoulders to render the interior of the post accessible.

3. In a friction shock absorbing mechanism, the combination with front and rear followers having interior, opposed, inwardly diverging wedge faces and transverse friction surfaces; and a central post having wedge means at opposite ends thereof and an elongated pocket between the ends, the opposite end walls of said pocket presenting transverse abutment faces; friction wedge means cooperating with the opposite ends of the post and followers, including a plurality of elements, certain of which have wedging engagement with the post and others of which have wedging engagement with the followers; and a retainer bolt at each end of the mechanism extending through the post and having shouldered engagement at opposite ends respectively with the corresponding follower and the abutment face at the same end of the post, whereby the followers are anchored to the post, the head of said bolts being accommodated for movement in said pocket of the post, said pocket being of such a length that the heads of the bolts are normally spaced apart a distance at least as great as the compression stroke of the mechanism.

In witness that I claim the foregoing I have hereunto subscribed my name this 15th day of May, 1929.

WILLIAM A. GEIGER.